United States Patent

Chun et al.

Patent Number: 6,101,230
Date of Patent: Aug. 8, 2000

[54] SAMPLING CLOCK SIGNAL RECOVERY DEVICE AND METHOD IN RECEIVING TERMINAL OF DMT SYSTEM

[75] Inventors: You-sik Chun, Sungnam; Seong-bae Cho, Suwon; Dong-gyu Kim, Busan, all of Rep. of Korea

[73] Assignee: Samsung Electronics Co., Ltd., Kyungki-do, Rep. of Korea

[21] Appl. No.: 08/815,074

[22] Filed: Mar. 11, 1997

[30] Foreign Application Priority Data

Mar. 11, 1996 [KR] Rep. of Korea .................. 96-6322

[51] Int. Cl.[7] ........................................ H04C 7/00
[52] U.S. Cl. ..................... 375/355; 375/371; 375/376
[58] Field of Search .................................. 375/355, 371, 375/375, 376; 327/165, 166, 167; 708/404, 445

[56] References Cited

U.S. PATENT DOCUMENTS

| | | | |
|---|---|---|---|
| 4,423,518 | 12/1983 | Hirosaki | 327/167 |
| 4,910,465 | 3/1990 | Dillman | 327/7 |
| 5,257,293 | 10/1993 | Taguchi | 375/375 |
| 5,519,733 | 5/1996 | Huang | 375/326 |
| 5,862,191 | 1/1999 | Moridi | 375/372 |

Primary Examiner—Temesghen Ghebretinsae
Assistant Examiner—Kevin M. Burd
Attorney, Agent, or Firm—Kile, McIntyre, Harbin & Lee; Eugene M. Lee

[57] ABSTRACT

A sampling clock signal recovery device and method for providing the sampling clock signal recovery device, in a receiving terminal of a discrete multitone (DMT) system, for accurately recovering a sampling clock signal by reducing sampling-induced jitter noise, i.e., by removing additive white Gaussian noise (AWGN) from the receiving terminal of the DMT system, and stably recovering a sampling clock signal. The above is accomplished by determining whether the phase error is smaller than a predetermined threshold value. If the phase error is equal to, or greater than the predetermined threshold value, then the instant invention corrects the sampling clock signal by the phase error. However, if the phase error is less than the predetermined threshold value, then the instant invention calculates an average value of some or all of decision error values, and corrects the sampling clock signal by the average value. Thus, a sampling clock signal is more accurately recovered.

18 Claims, 5 Drawing Sheets

● Average Conventional Phase Detector Outputs
■ Average Present Invention Phase Detector Outputs

● Average Conventional Phase Detector Outputs
■ Average Present Invention Phase Detector Outputs

SAMPLING CLOCK SIGNAL RECOVERY DEVICE AND METHOD IN RECEIVING TERMINAL OF DMT SYSTEM

BACKGROUND OF THE INVENTION

The present invention relates to a receiving terminal of a discrete multitone (DMT) system, and more particularly, to a device and method for recovering a sampling clock signal during initialization of a receiving terminal of the DMT system.

In general, the DMT system uses a multicarrier to maximize the efficiency of a channel by which data is transmitted. Several carrier-modulation waveforms are overlapped to represent an input bit stream in multicarrier modulation. A multicarrier transmission signal is the sum of N individual subsignals having the same bandwidth $$\frac{f_{Nyquist}}{N}$$

($f_{Nyquist}$ is the Nyquist frequency) and center frequencies $f_i$(i=1, 2, 3, . . . , N). These subsignals or subchannels are quadrature amplitude modulation (QAM) signals. In particular, when data is rapidly transmitted in an inferior transmission line such as a phone line, high-quality services can be rendered by using the DMT system since the transmission speed can be 6 Mbps or higher in applications of asymmetric digital subscriber lines (ADSL), and high-speed transmission is possible depending on the length and characteristics of the transmission path in applications of very high bit rate digital subscriber lines (VDSL). Even in a high-frequency area generating much noise, the system can dispense with a near subchannel, thereby protecting itself against various external damage factors.

The receiving terminal of the DMT system performs the functions of time recovery, filtering, and channel confirmation. The present invention pertains to time recovery and sampling clock signal recovery in the function of time recovery.

Sampling clock signal recovery, which is essential to every communications system, requires that a series of clocks, of a digital-to-analog converter in a transmitting terminal, are recovered in the receiving terminal. Since the DMT system simultaneously performs modulation and demodulation in DMT block units, i.e., inverse-fast-Fourier-transformer (IFFT) or fast-Fourier-transformer (FFT) performing units, during transmission and reception, the DMT system's receiving terminal should have a better clock signal recovering ability than that of a single carrier system.

A conventional sampling clock signal recovering device in the receiving terminal of the DMT system recovers a sampling clock signal, using only a predetermined data transmitted to a predetermined subchannel. Thus, noise of the 64th subchannel is reflected in the recovered sampling clock signal, influencing the sampling clock signal. Though a loop filter in phase-locked-loop (PLL) reduces the influence of noise, phase noise is not sufficiently reflected when the bandwidth of the loop filter is excessively reduced, whereas additive white Gaussian noise (AWGN) increases too much when the bandwidth increases. As a result, it is difficult for a phase locked loop (PLL) to perform accurate tracking.

In particular, in a system for simultaneously demodulating data of all subchannels using a fast-Fourier-transformer (FFT) such as a DMT system, AWGN-induced jitter of its receiving terminal adversely affects the recovery of data of all subchannels, especially data of the subchannel in a high-frequency area, thereby increasing the likelihood of generating many errors during high-speed data transmission.

SUMMARY OF THE INVENTION

An object of the present invention is to provide a sampling clock signal recovery device in a receiving terminal of a discrete multitone (DMT) system, for reducing the effect of additive white Gaussian noise (AWGN) from the receiving terminal of the DMT system, and stably recovering a sampling clock signal.

Another object of the present invention is to provide a sampling clock signal recovering method performed in the sampling clock signal recovering device in a receiving terminal of a DMT system.

To achieve the above objects, there is provided a sampling clock signal recovery device in a receiving terminal of a DMT system, having analog-to-digital converter for converting a transmitted analog signal loaded on a multicarrier into a digital signal in response to a sampling clock signal, fast-Fourier-transformer (FFT) for fast-Fourier-transforming the output of the analog-to-digital converting means, a frequency-domain equalizer (FEQ) for adjusting the received output of the FFT by the delay time of the analog signal during transmission. The sampling clock signal recovery device also detects a phase error from the output of the FEQ, removes noise, and outputs the result as the sampling clock signal.

The sampling clock signal recovery device comprises:

phase detecting means for detecting a phase error by comparing a pilot tone, extracted from a predetermined subchannel among the received output of the FEQ, with a predetermined value and for calculating decision error values of all or some of the signals output from the FEQ;

average value calculating means for calculating an average value of some or all of the decision error values;

determining means for determining whether the phase error is smaller than a predetermined threshold value, and outputting a selection signal according to the determined result;

selecting means for selectively outputting the received output of the average value calculating means or the phase error according to the selection signal;

a loop filter for outputting a voltage signal corresponding to the output of the selecting means; and voltage controlled oscillating means for oscillating the frequency of the sampling clock signal in response to the voltage signal.

To achieve another object, there is provided a sampling clock signal recovery method for recovering a sampling clock signal for a transmission terminal in a receiving terminal of a DMT system, comprising the steps of:

(a) detecting a phase error by comparing a transmitted pilot tone loaded on a multicarrier with a predetermined value of a predetermined subchannel;

(b) determining whether the phase error is smaller than a predetermined threshold value;

(c) correcting the sampling clock signal by the phase error when the phase error is equal to, or greater than, the predetermined threshold value and proceeding to step (a);

(d) calculating an average value of some or all of decision error values when the phase error is smaller than the predetermined threshold value; and correcting the sampling clock signal by the average value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
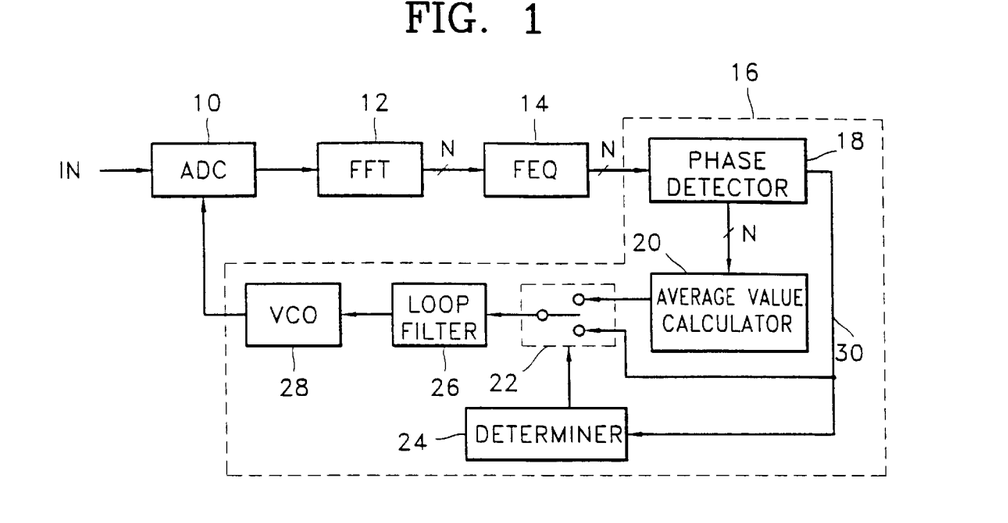
FIG. 1 is a block diagram of a receiving terminal of a DMT system according to the present invention.

Referring to FIG. 1, a receiving terminal of a DMT system according to the present invention has an analog-to-digital converter (ADC) 10 for converting a transmitted analog signal loaded on a multicarrier into a digital signal in response to a sampling clock signal, a fast-Fourier-transformer (FFT) 12 for fast-Fourier-transforming the output of the ADC 10, a frequency-domain equalizer (FEQ) 14 for adjusting the received output of the FFT 12 by the delay time of the analog signal during transmission, and a sampling clock signal recovery device 16 for detecting a phase error, removing noise from the received output of the FEQ 14, and outputting the result as a sampling clock signal.

Figure 2:
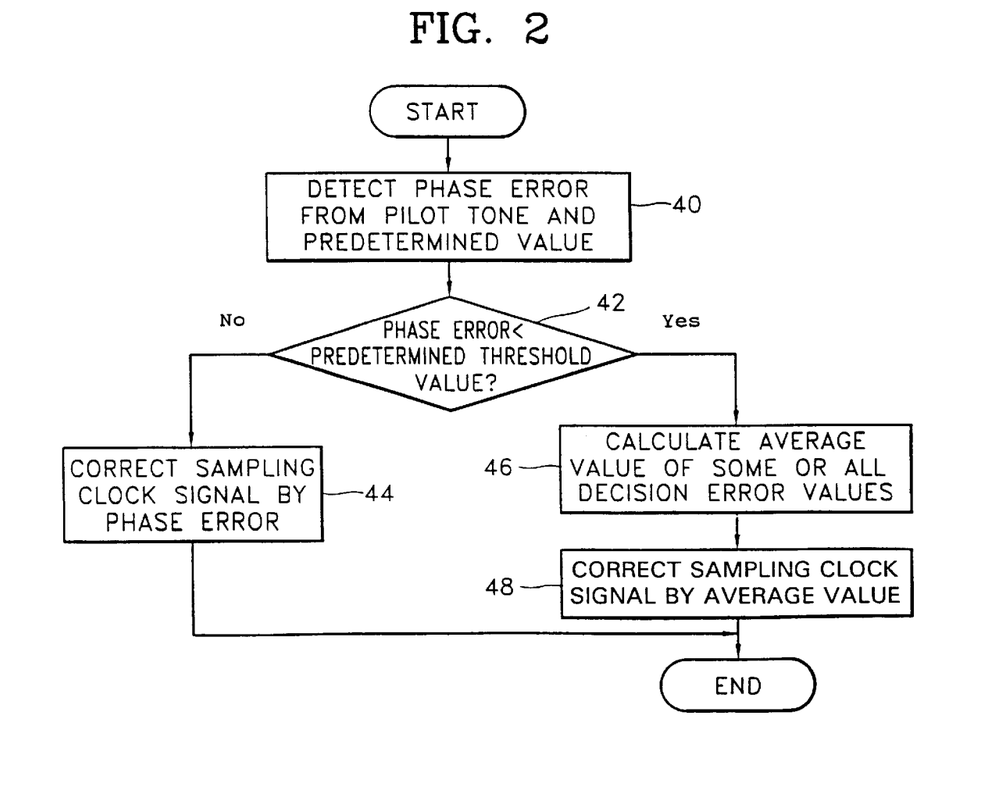
FIG. 2 is a flowchart illustrating a sampling clock signal recovery method of the present invention performed in the clock signal recovery device of FIG. 1.

FIG. 2 is a flowchart illustrating a sampling clock signal recovery method of the present invention performed in the sampling clock signal recovery device 16 of FIG. 1. The method includes the steps of: detecting a phase error during initialization of a receiving terminal (steps 28 and 40) and correcting a sampling clock signal by either a phase error (step 44), or an average of decision error values (steps 46 48 and 50). Through this method, AWGN is removed by calculating the average of decision error values in step 46.

The sampling clock signal recovery device 16 of the present invention shown in FIG. 1 includes a phase detector 18 for detecting a phase error on predetermined pilot tone in multiple DMT block units by comparing a pilot tone extracted from a predetermined subchannel among the received output of the FEQ 14 with a predetermined value, which is already known in the receiving terminal and calculating decision error values phase errors of all or some of subchannels including the pilot tone, of signals output from the FEQ 14, an average value calculator 20 for calculating an average value of the decision error values, a determiner 24 for determining whether the phase error on the pilot tone is smaller than a predetermined threshold value and outputting a selection signal, a selector 22 for selecting either the received output of the average value calculator 20 or the phase error on the pilot tone from the phase detector 18 in response to the selection signal, a loop filter 26 for outputting a voltage signal corresponding to the output of the selector 22, and a voltage controlled oscillator (VCO) 28 for oscillating the frequency of a sampling clock signal in response to the voltage signal.

The ADC 10 of FIG. 1 converts an analog signal input via an input terminal IN and transmitted through a transmission channel into a digital signal in response to the sampling clock signal output from the VCO 28. A serial digital signal output from the ADC 10 is converted into a plurality of, that is, N parallel digital signals in a serial-to-parallel converter (not shown) and output to the FFT 12. The FFT 12 demodulates a signal of each subchannel modulated in an IFFT (not shown) in a transmitting terminal of the DMT system and outputs the demodulated signal to the FEQ 14. During data transmission, the center frequencies of the respective subchannels differ from one another, and data loaded on the different frequencies each have unique delay values according to the frequencies when they pass through a transmission line. The FEQ 14 makes compensations for these delay values in the signals output from the FFT 12, which are shaped into complex coordinates.

A conventional phase detector 18 detects a phase error by extracting a pilot tone contained in a 64th subchannel among N subchannels output from the FEQ 14 and comparing the pilot tone with a predetermined known value. A pilot tone is transmitted for one subchannel in a transmitting terminal of an ADSL system, and a sampling clock signal is recovered using the pilot tone in a receiving terminal. The frequency of the pilot tone is defined as 276 KHz (=4.3125 KHz×64) for ADSL standards. When an actual transmission signal is received in the receiving terminal, the frequency of the sampling clock signal is 2.208 MHz, eight times larger than that of the pilot tone.

The phase detector 18 can detect the phase error (PD) by either an arc tangent method, as shown in equation (1), or by a direct decision (DD) method, as shown in equation (2).

$$PD_1 = ATAN\left(\frac{Y_C}{X_C}\right) \quad (1)$$

where $$X_C = \frac{X_R X_{REF} + Y_R Y_{REF}}{X_R^2 + Y_R^2}, Y_C = \frac{X_R X_{REF} - Y_R Y_{REF}}{X_R^2 + Y_R^2}$$

$$PD_2 = SIN^{-1}(X_R Y_{REF} - Y_R X_{REF}) \simeq X_R Y_{REF} - Y_R X_{REF} \quad (2)$$

In equations (1) and (2), the coordinates of a predetermined value to be compared with the pilot tone are defined as ($X_{REF}$, $Y_{REF}$) and the coordinates of the pilot tone extracted in the FEQ 14 are defined as ($X_R$, $Y_R$) on a complex plane. The arc tangent method, though being more linear than the DD method, is inferior to the DD method in terms of gain. However, both methods show similar performances.

As described above, since the conventional phase detector controls a sampling clock signal, using only the pilot tone of the 64th subchannel, AWGN of the subchannel is reflected. Consequently, the sampling clock signal cannot be accurately recovered and thus many errors are generated, especially in data of a high-frequency area.

The phase detector 18 of the present invention detects a phase error during initialization of the receiving terminal of the DMT system in the above-described conventional method (steps 38 and 40), and outputs the detected phase error to the determiner 24 and the selector 22 via a line 30 shown in FIG. 1. Further, the phase detector 18 calculates decision error values of the N subchannels output from the FEQ 14. Signals output from the FEQ 14 each take the form of complex coordinates and belong to one of arbitrary areas divided on a complex plane. Each area has a predetermined value, and subchannels in the same area have the same value. Thus, a phase error is made between the original value of a subchannel and a predetermined value for the subchannel, and this phase error is termed a decision error.

The determiner 24 determines whether the phase error on the pilot tone detected in the phase detector 18 is smaller than a predetermined threshold value (step 42). On one hand, if the determiner 24 determines that the phase error output from phase detector 18 is equal to, or greater than, the predetermined threshold value, the determiner 24 outputs a selection signal to the selector 22 so that the phase error output from the phase detector 18 is output to the loop filter 26 (step 44).

Meanwhile, the average value calculator 20 averages some or all of the decision errors output from the phase detector 18 by using either equation (4) or equation (5). The average value calculator 20 then outputs the average value, i.e., a decision error value $APD_1$ or $APD_2$ to the selector 22 (step 46).

$$APD_1 = \sum_{i=a}^{b} \frac{ATAN\left(\frac{Y_{C_i}}{X_{C_i}}\right)}{b-a+1} \quad (4)$$

where $$X_{C_i} = \frac{X_{R_i} X_{REF_i} + Y_{R_i} Y_{REF_i}}{X_{R_i}^2 + Y_{R_i}^2}, \quad Y_{C_i} = \frac{X_{R_i} X_{REF_i} - Y_{R_i} Y_{REF_i}}{X_{R_i}^2 + Y_{R_i}^2}$$

$$APD_2 = \frac{\sum_{i=a}^{b} SIN^{-1}(X_{R_i} Y_{REF_i} - Y_{R_i} X_{REF_i})}{b-a+1} \approx \frac{\sum_{i=a}^{b} (X_{R_i} Y_{REF_i} - Y_{R_i} X_{REF_i})}{b-a+1} \quad (5)$$

In equation (4), the decision error values are averaged by the arc tangent method, whereas in equation (5), the decision error values are averaged by the direct decision method. In equations (4) and (5), a denotes the number labeled to a first subchannel corresponding to a decision error value used for calculating an average, b denotes the number labeled to a last subchannel, and the other subscripts are the same as those defined in equations (1) and (2). Here, the number of subchannels corresponding to decision error values to be averaged is selected in consideration of efficient removal of AWGN and the calculation ability, that is, the operation speed of the system. In the case of frequency division modulation (FDM) as in ADSL applications, a low frequency is not available to a subscriber.

On the other hand, if the determiner 24 determines that the average phase error on the pilot tone output from the phase detector 18 is smaller than the predetermined threshold value after the phase error is stabilized to some extent, the determiner 24 outputs the selection signal to the selector 22 so that the average value output from the average value calculator 20 is output to the loop filter 26, in step 48.

The loop filter 26 shown in FIG. 1 receives the phase error or the average value $X_K$ output from the selector 22 and outputs $Y_K$ obtained in the following equation (6) to the VCO 28.

$$y_K = G_1 + G_2 \sum_{l=0}^{k} x_l \quad (6)$$

Here, $G_1$ represents a variable related to a tracking time, $G_2$ represents a variable determining the absence or presence of convergence, and subscript K denotes the time required for sampling. The VCO 28 controls the frequency of the sampling clock signal of the ADC 10 according to a voltage signal output from the loop filter 26 so that the sampling clock signal is controlled by the phase error or the average value, of the decision error values in step 44 or 48. The, the recovery of the sampling clock signal is completed in step 50.

The sampling clock signal recovering ability of the sampling clock signal recovery device and method will be described by comparison with a conventional sampling clock signal recovery device.

The conventional sampling clock signal recovery device (not shown) does not have an average calculator 20, a determiner 24, nor a selector 22 as shown in FIG. 1, and directly applies a phase error calculated in the phase detector to the loop filter 26 as described above.

Figure 3:
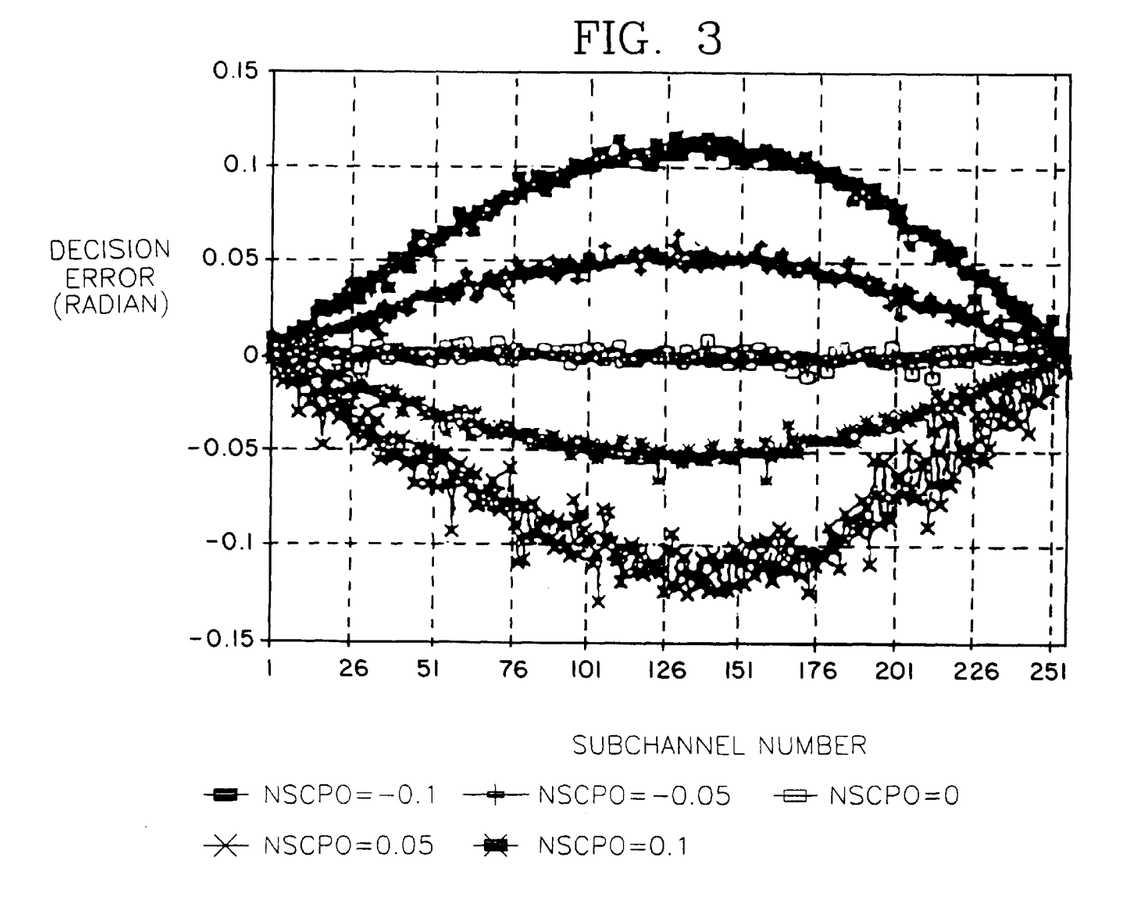
FIG. 3 is a scatter diagram showing decision errors with respect to subchannel members.

FIG. 3 is a view illustrating phase error rates of sampling for normalized sampling periods, that is, decision error values $\phi_n$ according to the normalized sampling clock signal phase offset (NSCPO) value with respect to subchannel numbers. ■ denotes values when NSCPO=−0.1, +denotes values when NSCPO=−0.05, ■ denotes values when NSCPO=0, * denotes values when NSCPO=0.05, and x denotes values when NSCPO=0.1 Here, NSCPO is the virtual noise applied to the ADC 10 of FIG. 1, and the decision error values φn can be expressed as:

$$\varphi_n \propto \sin\left(-\frac{n\pi}{N}\right) \times NSCPO \quad (3)$$

Figure 4:
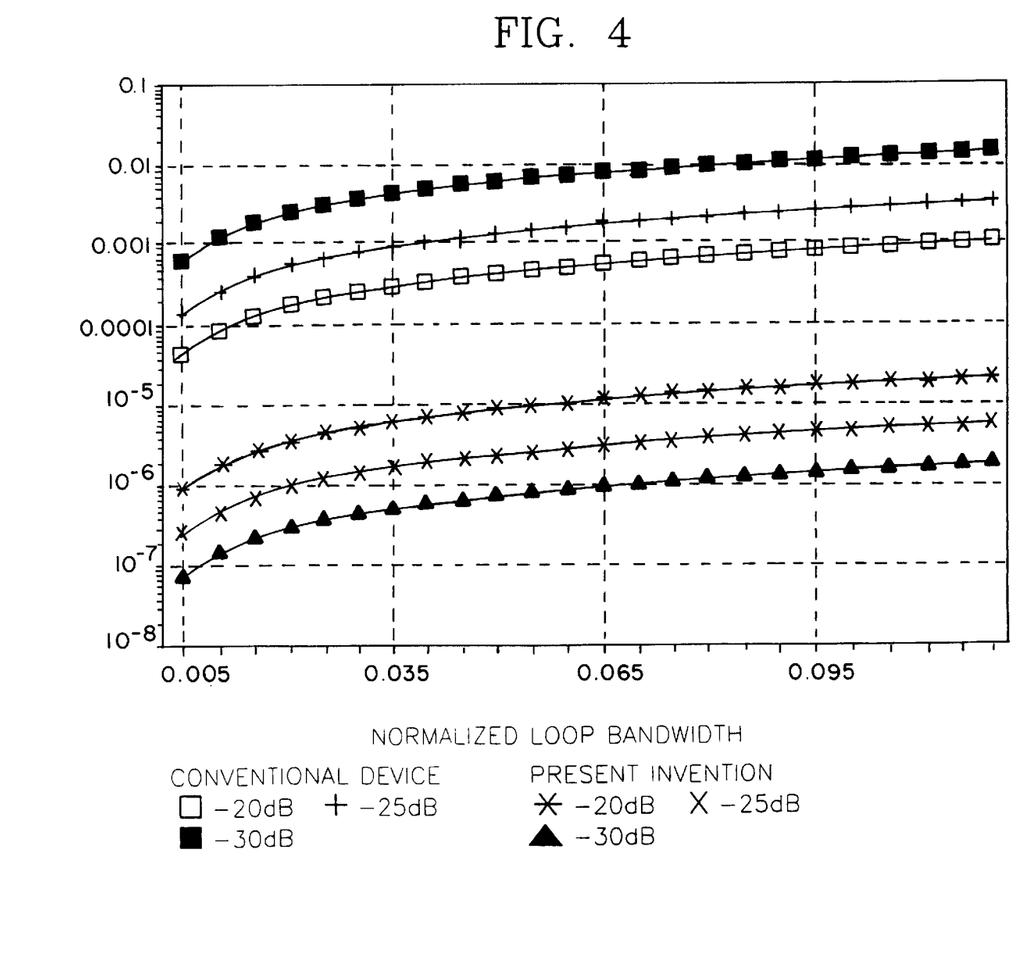
FIG. 4 is a log graph illustrating jitter characteristics of the sampling clock signal recovery device of the present invention and a conventional sampling clock signal recovery device.

FIG. 4 illustrates jitter characteristics of the sampling clock signal recovering device of the present invention and the conventional sampling clock signal recovering device. ■, +, and □ denote conventional normalized jitters according to normalized loop bandwidths for signal-to-noise ratios of 20, 25, and 30 dB, respectively. *, x, and ▲ denote normalized jitters of the present invention according to normalized loop bandwidths for signal-to-noise ratios of 20, 25, and 30 dB, respectively.

As shown in FIG. 3, it is noted that as the values of NSCPO increase, decision error values increase for mid-subchannel numbers. This indicates that phase offset is reflected in the device of the present invention and can be tracked. Therefore, by removing AWGN according to the method of the present invention, the phase offset is sufficiently tracked and AWGN-induced jitter is remarkably reduced, thereby reducing the total amount of jitter when compared to the conventional device shown in FIG. 4.

Figure 5A:
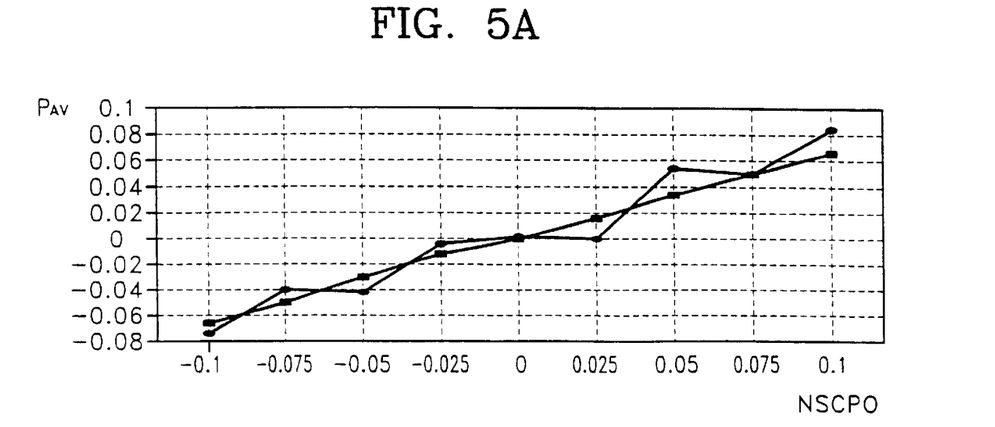
FIGS. 5A–5C are graphs for comparing the average values $P_{AV}$ of outputs of a phase detector of the present invention and a conventional phase detector at different signal-to-noise ratios.
Figure 5B:
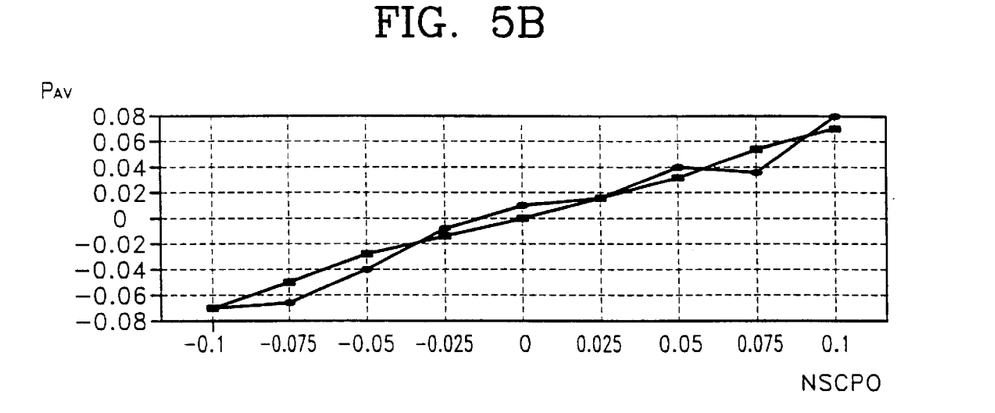
Figure 5C:
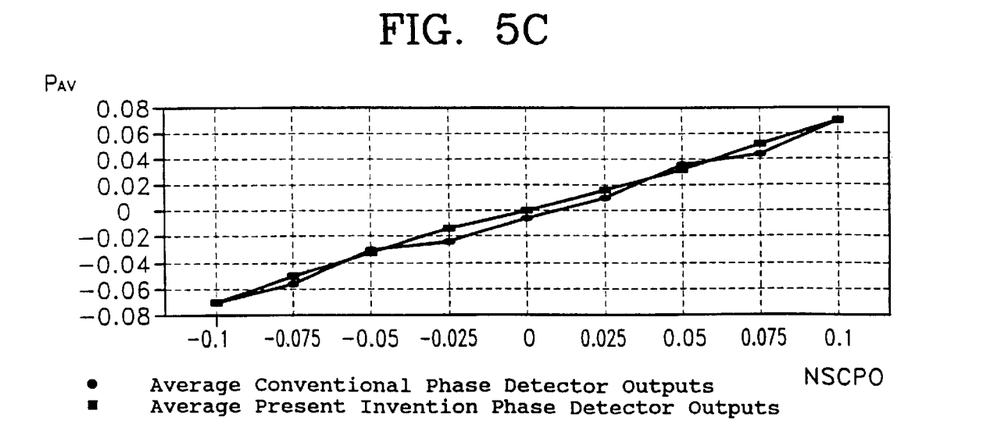

FIGS. 5A–5C illustrate comparisons of the average values $P_{AV}$ of outputs of the phase detector of the present invention and the conventional phase detector for signal-to-noise ratios of 20, 25, and 30 dB, respectively. ■ and ● denote the average values of the present invention and the prior art, respectively.

Figure 6A:
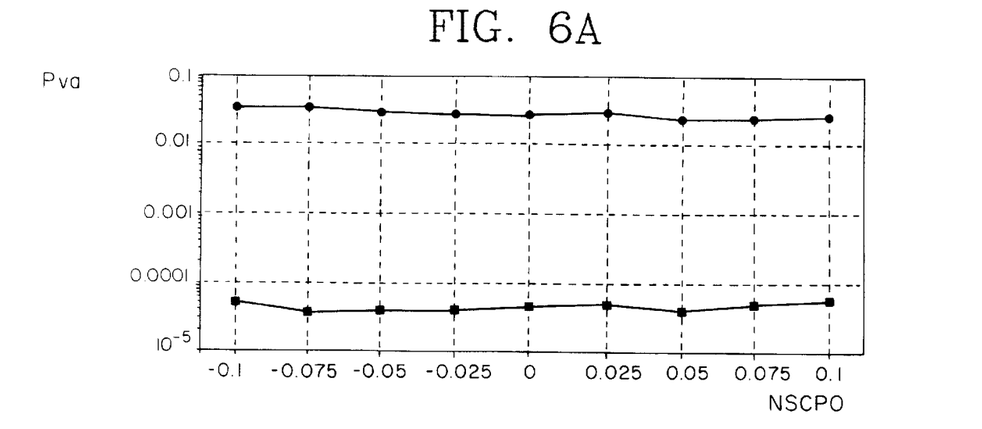
FIGS. 6A–6C are log graphs for comparing the variance values $P_{va}$ of outputs of the phase detector of the present invention and the conventional phase detector at different signal-to-noise ratios.
Figure 6B:
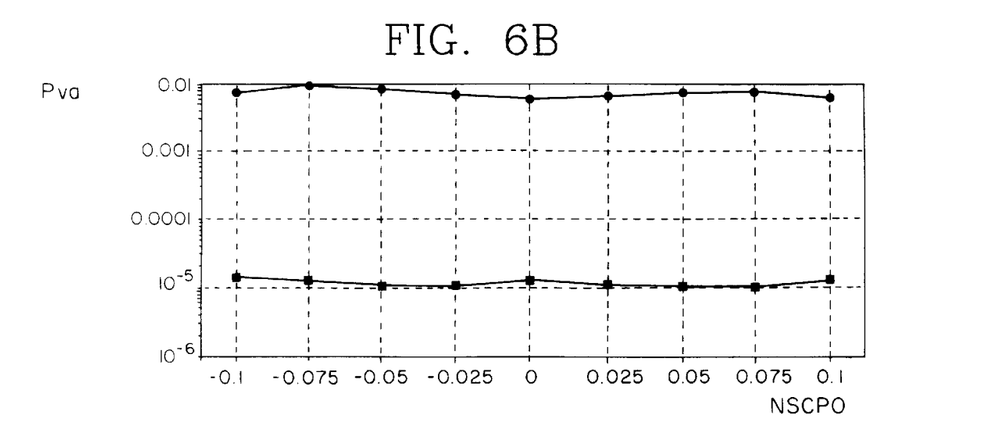
Figure 6C:
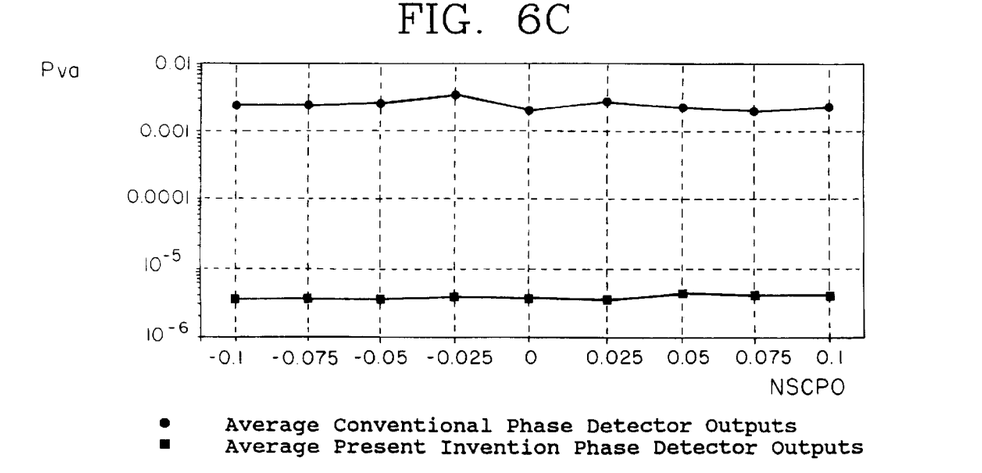

Comparisons of variance values $P_{va}$ of outputs of the phase detector of the present invention and the conventional phase detector are shown in FIGS. 6A–6C, for signal-tonoise ratios of 20, 25, and 30 dB, respectively. ■ and ● denote the variance values in the present invention and the prior art, respectively.

FIGS. 5A–5C and 6A–6C are views illustrating comparisons of average and variance values of the outputs of the phase detector of the present invention and the conventional phase detector by intentionally applying NSCPOs to the ADCs via input terminal IN. Decision errors are used for the average and variance value of the output of the phase detector 18 according to the present invention.

As shown in FIGS. 5B and 5C, the average value of the present invention is zero when NSCPO is zero. In addition, as shown in FIGS. 6A–6C, the variance value of decision error values in the present invention is smaller than that of the prior art.

As described above, the sampling clock signal recovery device and method in a receiving terminal of a DMT system according to the present invention can more accurately recover a sampling clock signal and reduces sampling-induced jitter noise by removing AWGN when the receiving terminal of the DMT system is stabilized to some extent.

The Korean Patent Application No. 1996-6322, filed Mar. 11, 1996, is incorporated by reference herein.

What is claimed is:

1. A sample clock signal recovery device for recovering a sampling clock signal in a receiving terminal of a discrete multitone (DMT) system, the sample clock signal recovery device comprising:

an analog-to-digital converter for converting a transmitted analog signal, loaded on a multicarrier, into a digital signal;

a fast Fourier transformer for fast Fourier transforming the digital signal and outputting a resultant signal;

a frequency-domain equalizer for adjusting the resultant signal by a delay time associated with transmission of the transmitted analog signal and outputting a signal;

a phase detector for detecting a phase error in a signal from the frequency-domain equalizer and for calculating a plurality of decision error values;

an average value calculator for calculating an average value of a selected number of the plurality of decision error values;

a determining means for determining whether the phase error is less than a predetermined threshold value; and a selector means responsive to the determining means for selectively outputting either the phase error, or the average value, in order to recover the sampling clock signal.

2. A sample clock signal recovery device according to claim 1, further comprising:

a loop filter for outputting a voltage signal corresponding to either the phase error, or the average value, depending upon the selector means; and a voltage controlled oscillator for oscillating at a frequency consistent with that of the sampling clock signal, in response to the voltage signal;

wherein the analog-to-digital converter is governed by the sampling clock signal.

3. A sample clock signal recovery device, according to claim 1, wherein the selected number of the plurality of decision error values comprise all of the plurality of decision error values.

4. A sample clock signal recovery device, according to claim 1, wherein each of the plurality of decision error values comprise a phase error between a subchannel of a transmitted analog signal, and a predetermined value for the subchannel.

5. A sample clock signal recovery device, according to claim 1, wherein the phase detector detects the phase error by an arc tangent method.

6. A sample clock signal recovery device, according to claim 1, wherein the average value calculator calculates the average of the plurality of decision error values by an arc tangent method.

7. A sample clock signal recovery device, according to claim 1, wherein the phase detector detects the phase error by a direct decision method.

8. A sample clock signal recovery device, according to claim 1, wherein the average value calculator calculates the average of the plurality of decision error values by direct decision method.

9. A method for recovering a sampling clock signal for a transmission terminal in a receiving terminal of a discrete multitone system, the method comprising:

(a) converting a transmitted analog signal, loaded on a multicarrier, into a digital signal;

(b) fast Fourier transforming the digital signal and outputting a resultant signal;

(c) adjusting the resultant signal by a delay time associated with transmission of the transmitted analog signal and outputting an adjusted signal;

(d) detecting a phase error in the adjusted signal;

(e) determining whether the phase error is less than a predetermined threshold value;

(f) calculating an average value of a plurality of decision error values;

(g) correcting the sampling clock signal by the phase error when the phase error is equal to, or greater than, the predetermined threshold value; and (h) correcting the sampling clock signal by the average value when the phase error is less than the predetermined threshold value.

10. A method for recovering a sampling clock signal according to claim 9, further comprising:

(i) outputting a voltage signal corresponding to the phase error, when the phase error is equal to, or greater than, the predetermined threshold value;

(j) outputting a voltage signal corresponding to the average value, when the phase error is less than the predetermined threshold value; and (k) oscillating at a frequency consistent with that of the sampling clock signal, in response to the voltage signal; wherein converting a transmitted analog signal is governed by the sampling clock signal.

11. A method for recovering a sampling clock signal, according to claim 9, wherein the selected number of the plurality of decision error values comprise all of the plurality of decision error values.

12. A method for recovering a sampling clock signal, according to claim 9, wherein each of the plurality of decision error values comprise a phase error between a subchannel of a transmitted analog signal, and a predetermined value for the subchannel.

13. A method for recovering a sampling clock signal, according to claim 9, wherein the phase detector detects the phase error by an arc tangent method.

14. A method for recovering a sampling clock signal, according to claim 9, wherein the average value calculator calculates the average of the plurality of decision error values by an arc tangent method.

15. A method for recovering a sampling clock signal, according to claim 9, wherein the phase detector detects the phase error by a direct decision method.

16. A method for recovering a sampling clock signal, according to claim 9, wherein the average value calculator calculates the average of the plurality of decision error values by direct decision method.

17. A sampling clock signal recovery device in a receiving terminal of a discrete multitone (DMT) system, having analog-to-digital converting means for converting a transmitted analog signal loaded on a multicarrier into a digital signal in response to a sampling clock signal, fast Fourier transforming (FFT) means for fast-Fourier-transforming the output of said analog-to-digital converting means, a frequency-domain equalizer (FEQ) for adjusting the received output of said FFT means by the delay time of said analog signal during transmission, and wherein said sampling clock signal recovery device detects a phase error from the output of said FEQ, removes noise, and outputs a result as said sampling clock signal, said sampling clock signal recovery device comprising:

phase detecting means for detecting a phase error by comparing a pilot tone extracted from a predetermined subchannel among the received output of said FEQ with a predetermined value and calculating decision error values of all or some of the signals output from said FEQ;

average value calculating means for calculating an average value of some or all of said decision error values;

determining means for determining whether said phase error is smaller than a predetermined threshold value, and outputting a selection signal according to the determined result;

selecting means for selectively outputting the received output of said average value calculating means or said phase error according to the selection signal;

a loop filter for outputting a voltage signal corresponding to the output of said selecting means; and voltage controlled oscillating means for oscillating the frequency of said sampling clock signal in response to said voltage signal.

18. A sampling clock signal recovery method for recovering a sampling clock signal for a transmission terminal in a receiving terminal of a discrete multitone (DMT) system, comprising the steps of:

(a) converting a transmitted analog signal having a pilot tone, loaded on a multicarrier, into a digital signal;

(b) fast Fourier transforming the digital signal and outputting a resultant signal;

(c) adjusting the resultant signal by a delay time associated with transmission of the transmitted analog signal and outputting an adjusted signal;

(d) detecting a phase error by comparing the pilot tone with a predetermined threshold value of a predetermined subchannel;

(e) determining whether the phase error is smaller than a predetermined threshold value;

(f) correcting the sampling clock signal by the phase error when the phase error is equal to or greater than, the predetermined threshold value;

(g) calculating an average value of some or all of a plurality of decision error values when the phase error is smaller than the predetermined threshold value; and (h) correcting the sampling clock signal by said average value when the phase error is smaller than the predetermined threshold value.

* * * * *